July 3, 1962 W. HIDDING 3,042,067
TUBE CLAMP
Filed Feb. 9, 1960
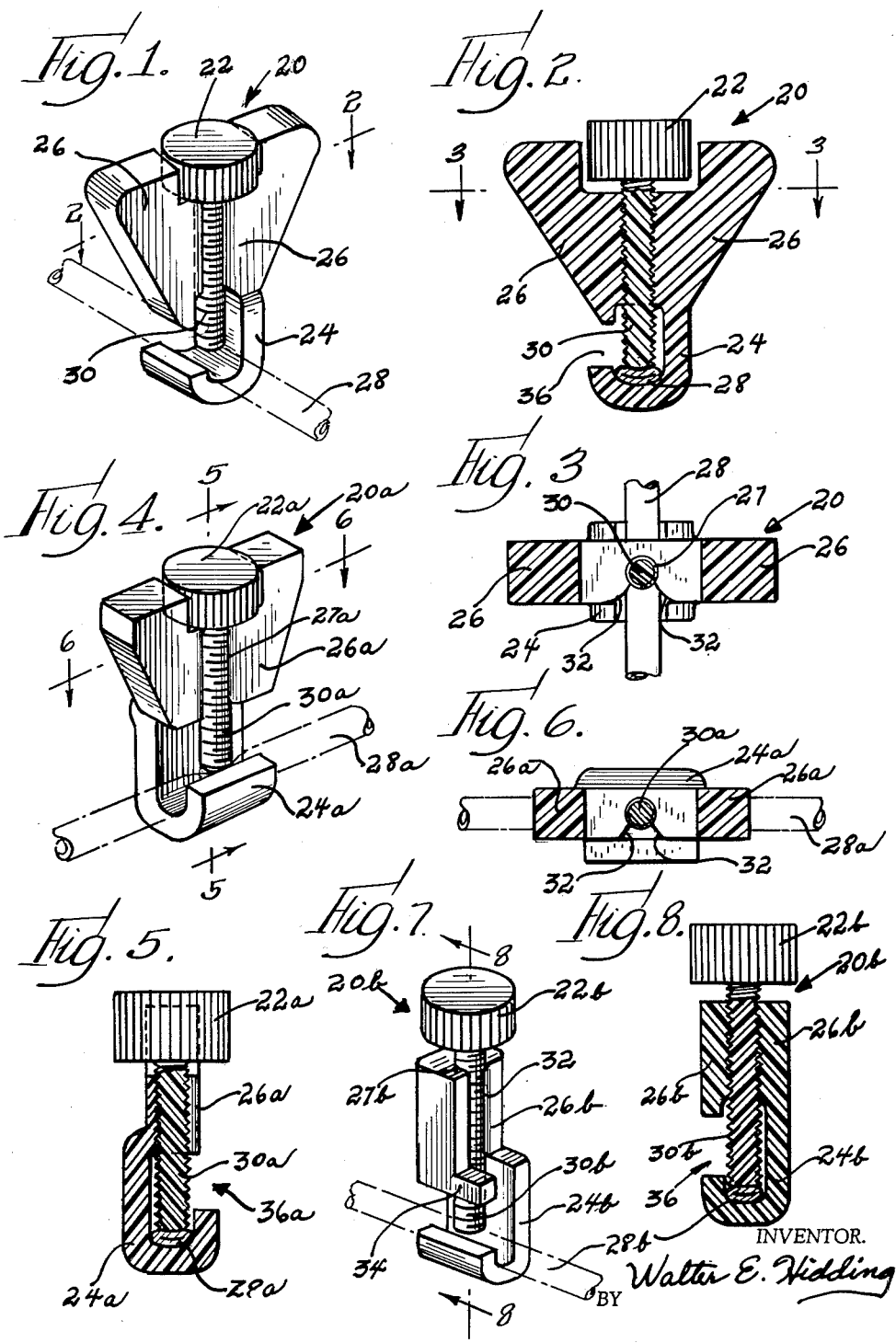
INVENTOR.
Walter E. Hidding 3,042,067
TUBE CLAMP
Walter Hidding, 505 Banbury Road,
Arlington Heights, Ill.
Filed June 9, 1960, Ser. No. 7,605
5 Claims. (Cl. 137—315)

This invention relates generally to an improvement in clamps for hoses or tubing and, more particularly, relates to an improvement in a pinch-type clamp for tubing made of resilient material.

The present invention has been designed to overcome a difficulty which has been noted wherever deformable types of tubing or hoses require a clamp to restrict the flow of fluids or gases therethrough. For example, in the medical field it is quite common to introduce blood, saline solutions and other medicants into a patient's veins through a sterile deformable tubing which has adjacent its free end a needle extending into the patient's vein. In such situations, it is often desirable to be able to control the rate of flow of the fluid or other material so that the patient is able to assimilate the medicant being fed to him intravenously. I am well aware of devices presently in use, such for example as the device which I make and which is covered by U.S. Patent No. 2,908,476, these devices usually being made so that a jaw is presented which accepts the resilient tubing and a threaded aperture receives a screw or the like at an angular relationship to said jaw so that the screw may be threaded in a direction toward or away from said tubing to pinch or relieve the pinched tubing to obtain the desired result. I am also aware of attempts to use various types of heavy gauge foil which can be wrapped around the tubing and caused to take a set thereby collapsing the tubing in the position set by the nurse or doctor to cause the above-described desired result.

The device constituting the instant invention is an effort to improve the first mentioned type of clamp, namely, clamps which include a jaw-like portion to receive a tube at one end and which is provided with a screw as previously described. It has been found difficult by manufacturers to mold or otherwise prepare the body portion of a clamp with a threaded aperture into which the screw element is mounted. If the clamp is made of metal, it is usual for the body portion to be bored in the two directions necessary to provide the jaw-like element to receive the tube and the passage to receive the screw threaded body. Thereafter the passage is threaded by a tap to finish the manufacture of the part. If the clamp body is made of plastic, it is necessary because of the angular arrangement of the passage which holds the screw and the aforementioned jaw-like element which receives the tubing to be formed in the molding process by core pins which obviously are arranged in the same fashion, namely, angularly, as the final positioning of the bores which they provide. This leads to a costly method of manufacture as these core pins must be removed in angular relationship and this, of course, is both costly from the standpoint of the mold per se and costly from the standpoint of the manufacturing time required to form each and every clamp member.

It is therefore, one of the objects of my invention to provide a clamp having a body wherein the necessity for withdrawal of mold pins when the part is made of plastic is eliminated.

It is still another object of the invention to provide a clamp body arranged to accept a screw-threaded element, either plastic or metal without the necessity of threading the fastener through the entire bore. This object contemplates facilitation of mounting the screw from the manufacturer's standpoint to provide the assembly which is contemplated to be sold to the ultimate consumer.

It is still another object of the invention to provide a combined stud and clamp body assembly wherein the stud after mounting is retained against inadvertent movement relative to the body of the clamp to assure its positionment in any predetermined selected position to assure proper metering of the fluids passing through the tube as has been previously explained.

It is still another object of the invention to provide a clamp unit which can be operated with facility by one hand of the party operating same, both from the standpoint of its mounting onto a flexible tube and the adjustment of the screw relative to the clamp body and the tube mounted in the jaw or bore of the body.

These and other objects of the invention will be more clearly understood by reading the following specification with reference to the claims wherein:

FIG. 1 is a perspective drawing of the clamp body with a stud element mounted therein.

FIG. 2 is a cross-sectional view of the clamp unit shown in FIG. 1 taken along the line 2—2 in FIG. 1.

FIG. 3 is a sectional view of the clamp unit shown in FIG. 2 taken along the line 3—3.

FIG. 4 is a perspective view of a second embodiment of the invention.

FIG. 5 is a sectional view taken through the clamp unit shown in FIG. 4 shown along the line 5—5 thereof.

FIG. 6 is a sectional view taken of the invention shown in FIG. 4 along the line 6—6.

FIG. 7 is a perspective view of the clamp unit in still another modified form.

FIG. 8 is a sectional view of the clamp unit shown in FIG. 7 taken along the line 8—8 thereof.

Referring now to the drawings wherein like numerals have been used to describe similar elements in the various embodiments, FIG. 1 shows one form of the invention consisting of the body designated generally by the numeral 20, a headed screw 22 (the head of the screw preferably being knurled) and a screw-threaded body of conventional design. Clamp body 20 is provided at one end with a jaw or C-shaped element 24 which is adapted to house after reception the flexible tubing adapted to be mounted therein 28. The opening through which the complimentary tube 28 is mounted is designated by the numeral 36 and permits easy access for mounting of the tube 28. The remaining portion of the clamp body consists of two wing-like elements 26 which project on either side of the threaded bore 27 which is adapted to receive and house the threaded stud 22. It is preferred that the wings 26 have substantial extent so that they can be readily grasped by the fingers of the user to maintain the clamp body in oriented position as the knurled head of the screw 22 is rotated relative thereto. This aspect of the described embodiments is covered in my recently issued patent, U.S. Patent No. 2,908,476. The threaded bore 27 which receives the threaded shank portion 30 of screw 22 is formed by a threaded core pin in the molding process which is stripped or, pulled out sideways relative to the threaded bore 27. Note the fact that the threaded bore has a peripheral measurement greater than 180 degrees so that it may embrace or encompass more than one-half of a circular threaded screw element which is adapted to be mounted therein. Cam surfaces 32 are provided to facilitate the snapping of the screw 22 with its threaded shank 30 into the aforementioned threaded bore. In the molding process, it is sometimes preferred that a core pin of slightly smaller form or dimension than the threaded stud be used so that upon snapping in, or mounting, of the screw element 22 there is an impingement to accomplish a prevailing torque upon the threaded screw 22 to assure the positionment of the screw in any desired predetermined position. The nature of the material, namely, by using plastics and other similar materials, assures the user of the flexible characteristics of the material to accomplish the above-described end result.

It should be noted in the embodiment shown in FIGS. 1, 2 and 3 that the opening to the threaded bore 27 is in a direction coincident with the axis of the bore in the jaw of the fastener 24. It is sometimes desired that the clamp body be made in such a way as to avoid the aforementioned exposure or direction of opening of the threaded bore, therefore, the necessity of the embodiment about to be described as shown in FIGS. 4, 5 and 6.

The embodiment in FIG. 4 clearly shows a clamp body 20a with a screw element 22a mounted therein, wing elements 26a having substantial lateral extent and a jaw-like element 24a adapted to receive the complementary tube 28a prior to the clamping of the screw relative thereto. Note that the bore or passageway of the jaw is angularly disposed relative to the passageway 27a which receives the threaded body of screw member 22a. Note also that the direction of opening of the throat of the threaded passageway 27a is in a direction at right angles, or substantially thereto, to the axis of the passageway in jaw 24a. Supposedly, by arranging the threaded passageway having a greater circumferential extent than 180 degrees, and after mounting of the screw therein, as the user makes adjustments of the knurled screw heads relative to the wings 26a, the tendency is to help to retain the threaded stud in the partially threaded bore by reasons of the user's fingers being in overlying relation relative thereto. While this is true of all forms of the invention, with the added arrangement of opening of the threaded bore relative to the axis of the jaw, some users have found this form to be preferred. FIG. 7 shows still another form of the invention which eliminates the wing-like projection 26 shown in the embodiment of FIG. 1. FIG. 7 is related to FIG. 1 in that the opening of the partially threaded bore extends in a direction parallel to the axis of the passageway or bore of jaw 24b. Obviously less plastic is used in this form and the additional feature of the abutment shoulders 34 are provided which tend to give additional body to the portion of the clamp body surrounding the threaded screw. The provision of the element 34 gives a guard element to the throat of the opening and tends to cause the user of the device to compress the U-shaped passageway 27b into which the screw has been mounted thereby to assure firm gripping of the threaded shank 30b of stud 22b.

In operation, after mounting of the screw 22 in the body portion 20 and assembly of the collapsible tubing 28, the stud element as it is rotated relative to the body portion 20 impinges upon the tubing 28. As rotation of the screw progresses, the tube 28 is collapsed in increments thereby accomplishing construction of the hose or tubing at that point. It is obvious that the hose can be collapsed to any desired position to permit the fluid passing therethrough only to pass at a controlled rate of flow. It should be obvious that it is highly advantageous that upon retraction of the stud for any reason that the stud is held in any predetermined position relative to the body so as to cause the setting of the screw to be maintained.

What I have shown and described is a novel form of pinch clamp for tubing including sufficient embodiments which can be relatively inexpensively produced or manufactured and are effective to overcome the problems which it has been heretofore indicated have interfered with the use of presently known commercially available embodiments of products in this field. Having thus shown and described my invention, and realizing what has been shown and described does not limit me but has been shown and described only for the purpose of illustrating my invention, what I claim is:

1. A pinch clamp comprising: a screw element; and a body member formed of resilient material and including a C-shaped jaw adapted to receive a section of flexible tubing, said body member further including a bore provided internally with threads complementary to the threads on the shank of said screw element, said bore progressively passing an end of said screw element into pinching engagement with a portion of the section of flexible tubing received in said jaw, said bore having a radially opening portion along the entire axial length thereof, said radially opening portion being generally less than 180 degrees in extent whereby positively to house said screw element, the edges of said radially opening portion being capable of sufficient flexing to permit assembly of said screw element with said body member by urging said screw element radially into engagement with said bore through said radially opening portion.

2. A pinch clamp comprising: a screw element; and a body member including a C-shaped jaw adapted to receive a section of flexible tubing, said body member further including a bore provided internally with threads complementary to the threads on the shank of said screw element, said bore progressively passing an end of said screw element into pinching engagement with a portion of the section of flexible tubing received in said jaw, said bore having a radially opening portion along the entire axial length thereof, said radially opening portion being generally less than 180 degrees in extent whereby positively to house said screw element, said body member being fashioned from a resilient, resinous plastic material and the edges of said radially opening portion being sufficiently flexible to accommodate insertion of said screw element in said body member by urging said element radially into engagement with said bore through said radially opening portion.

3. A pinch clamp according to claim 2 wherein said body member is provided with cam surfaces adjacent the edges of said radially opening portion for leading said screw element into said bore.

4. A pinch clamp according to claim 1 wherein said radially opening portion opens in a direction normal to the longitudinal axis of said jaw.

5. A pinch clamp according to claim 1 wherein said radially opening portion opens in a direction parallel to the longitudinal axis of said jaw.

References Cited in the file of this patent

UNITED STATES PATENTS

| | | |
|---|---|---|
| 1,313,515 | Caffrey | Aug. 19, 1919 |
| 2,614,788 | Woodward | Oct. 21, 1952 |
| 2,908,476 | Hidding | Oct. 13, 1959 |